United States Patent
Lee et al.

(10) Patent No.: US 7,227,621 B2
(45) Date of Patent: Jun. 5, 2007

(54) SYSTEM FOR VISUALIZING FLOW AND MEASURING VELOCITY FIELD USING X-RAY PARTICLE IMAGE VELOCIMETRY

(75) Inventors: Sang Joon Lee, Kyungsangbuk-do (KR); Guk Bae Kim, Kyungsangbuk-do (KR)

(73) Assignee: Postech Foundation, Kyungsangbuk-do (KR)

( * ) Notice: Subject to any disclaimer, the term of this patent is extended or adjusted under 35 U.S.C. 154(b) by 216 days.

(21) Appl. No.: 10/928,166

(22) Filed: Aug. 30, 2004

(65) Prior Publication Data

US 2006/0044548 A1 Mar. 2, 2006

(51) Int. Cl.
  *G01P 3/36* (2006.01)
  *G01F 25/00* (2006.01)
(52) U.S. Cl. .................. 356/28; 356/28.5; 73/1.24
(58) Field of Classification Search .............. 73/1.24, 73/53.04, 170.01, 170.04, 861, 861.05; 356/28, 356/28.05; 378/47, 62; 250/302, 370.09
See application file for complete search history.

(56) References Cited

U.S. PATENT DOCUMENTS 6,292,528 B1 * 9/2001 Wieczorek et al. ............ 378/19
6,567,682 B1 * 5/2003 Osterweil et al. ........... 600/407
2004/0092817 A1 * 5/2004 Brock-Fisher .............. 600/431

FOREIGN PATENT DOCUMENTS

KR    2004065846 A   *  7/2004

* cited by examiner

*Primary Examiner*—Thomas H. Tarcza
*Assistant Examiner*—Isam Alsomiri
(74) *Attorney, Agent, or Firm*—Bacon & Thomas, PLLC

(57) ABSTRACT

A system for measuring flow information of a fluid, the system includes a light emission control unit for passing an X-ray through a specimen only at desired moments; a scintillator installed on an axis of a beam to convert an X-ray wavelength flow image, which is generated while the X-ray passes through the specimen, into a visible wavelength flow image; and a recording device for acquiring a flow image focused on the scintillator. The system may further include a synchronization unit for synchronizing the recording device with the light emission control unit to acquire two or more flow images at a predetermined interval using the recording device; and a PIV velocity field measurement unit for extracting quantitative flow information from the two or more flow images acquired by the recording device.

14 Claims, 8 Drawing Sheets

WHEN CONTRAST MEDIUM IS ABSENT

WHEN CONTRAST MEDIUM
HAS BEEN INJECTED

SYSTEM FOR VISUALIZING FLOW AND MEASURING VELOCITY FIELD USING X-RAY PARTICLE IMAGE VELOCIMETRY

FIELD OF THE INVENTION

The present invention relates to a system for measuring flow information; and, more particularly, to a system for measuring flow information inside an opaque object or the flow information of an opaque fluid.

BACKGROUND OF THE INVENTION

Particle Image Velocimetry (PIV), which acquires a quantitative velocity field by processing a flow image containing displacement information of particles inside a flow, is a measurement technique that is capable of not only providing qualitative instantaneous flow information but also extracting quantitative flow information having high spatial resolution. As for such PIV, PIV in a narrow sense and Particle Tracking Velocimetry (PTV) are mainly used. In PIV in a narrow sense, an instantaneous velocity field is obtained by computing a Fourier transform or a direct correlation coefficient with respect to an intensity profile of dispersion particle images within an interrogating window of flow images. In general, PIV in a narrow sense is applied to a case where particle density is high, and computes quantitative velocity information by extracting a representative velocity of the interrogating window. Unlike PIV in a narrow sense, PTV obtains displacement information of each particle by extracting locations of the particle from a plurality of flow images successively obtained and tracking the particle. FIG. 1 is a diagram showing a basic principle of a PIV velocity field measurement technique using digital image processing. The PIV velocity field measurement technique obtains an instantaneous velocity field by dividing displacements of particles, which have been captured from two particle images obtained at a time interval $\Delta t$, by the time interval $\Delta t$. The PIV velocity field measurement technique, which will be mentioned in this application, includes both PIV in a narrow sense and PTV.

In the meantime, there are several techniques that are capable of observing interiors of opaque objects that cannot be observed by a naked eye, such as a human body. The techniques include many using X-rays, such as a clinical X-ray and an X-ray for non-destructive inspection. X-ray equipment is being used to visualize internal structures of objects, in various fields, such as a detection of internal structures of various substances, a visualization of an inside of a human body and a non-destructive inspection of defects inside an industrial equipment.

The PIV velocity field measurement technique and the X-ray imaging techniques are excellent techniques, but have the following disadvantages. The PIV technique can measure a quantitative velocity field information of a given flow, but has a limitation in that an experimental model and a working fluid must be all transparent because an image of particles seeded inside a flow must be acquired using visible light such as laser light. That is, it is impossible to measure a flow inside an opaque object or an opaque fluid flow with a conventional PIV technique which employs visible light, such as white light or laser light.

In the meantime, the conventional X-ray imaging techniques can visualize the interiors of objects, which cannot be observed by a naked eye, using transmitting feature of X-rays. However, most testing specimens of the conventional X-ray imaging techniques are solid objects. The conventional X-ray imaging techniques are used for visualizing internal structures of objects and have imperfections in a measurement of fluid flows inside opaque objects. Furthermore, evolution of trace particles tracking a flow causes a difference in phase or density with respect to an X-ray, has hardly progressed. Accordingly, there has been no case where a flow inside an object has been quantitatively measured using the conventional X-ray imaging techniques. Since it has not been long since the PIV velocity field measurement techniques using visible light were developed, and further since the fields, to which the velocity field measurement techniques are applied, and the fields, to which the X-ray imaging techniques are applied, are very different from each other, there has been no attempt to combine the PIV velocity field measurement technique with the X-ray imaging techniques.

SUMMARY OF THE INVENTION

It is, therefore, an object of the present invention to provide a system that is capable of quantitatively measuring the flow information of a fluid inside an opaque object or the flow information of an opaque fluid using an X-ray PIV velocity field measurement technique.

In accordance with the present invention, there is provided a system for measuring flow information of a fluid, the system including a light emission control unit for passing an X-ray through a specimen only at desired moments; a scintillator installed on an axis of a beam to convert an X-ray wavelength flow image, which is generated while the X-ray passes through the specimen, into a visible wavelength flow image; and a recording device for acquiring the visible wavelength flow image focused on the scintillator. The system may further include a synchronization unit for synchronizing the recording device with the light emission control unit to acquire two or more flow images at a predetermined interval using the recording device; and a PIV velocity field measurement unit for extracting quantitative flow information from the two or more flow images acquired by the recording device. In the present invention, various types of X-rays, such as a radiation X-ray, a clinical X-ray and an X-ray for non-destructive inspection, may be employed to observe interiors of visible and invisible objects.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

A preferred embodiment of the present invention will now be described in detail with reference to the accompanying drawings.

Figure 1:
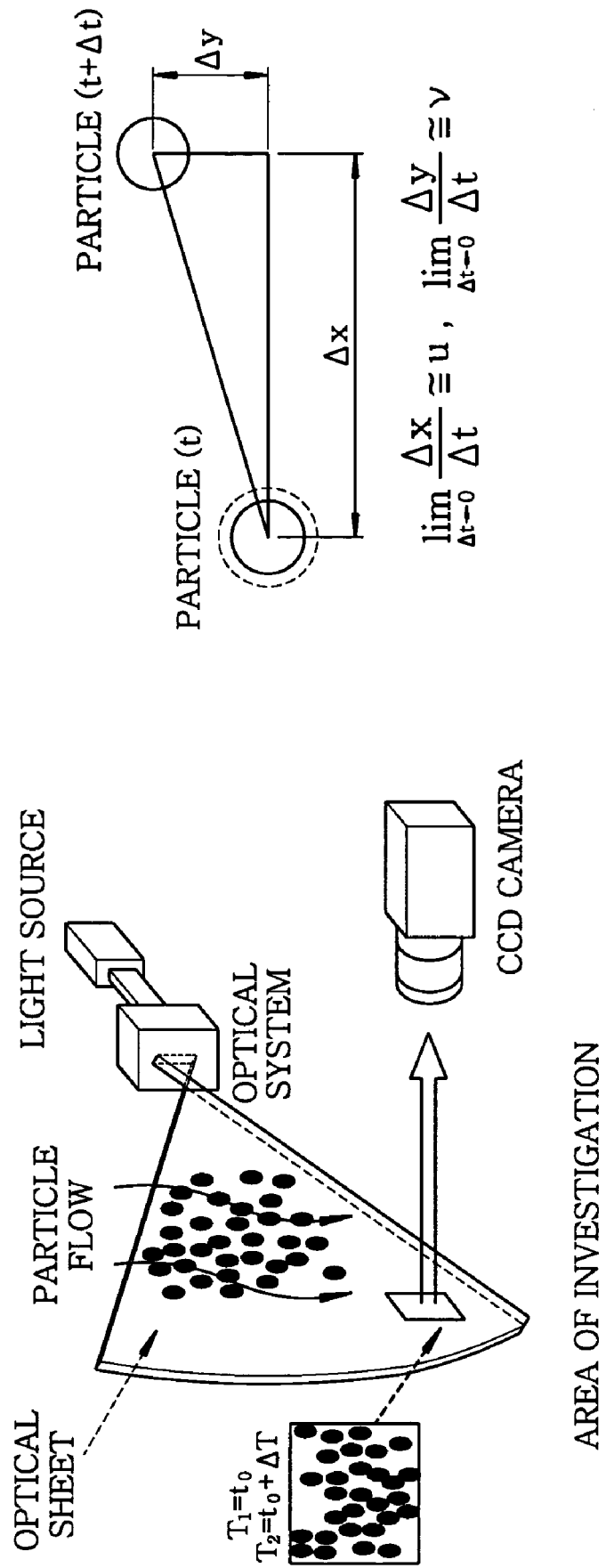
FIG. 1 is a conceptual diagram of a PIV velocity field measurement technique in which quantitative flow information is acquired by successively measuring images of particles inside a flow at a short interval $\Delta t$ and digitally image-processing the measured images.
Figure 2:
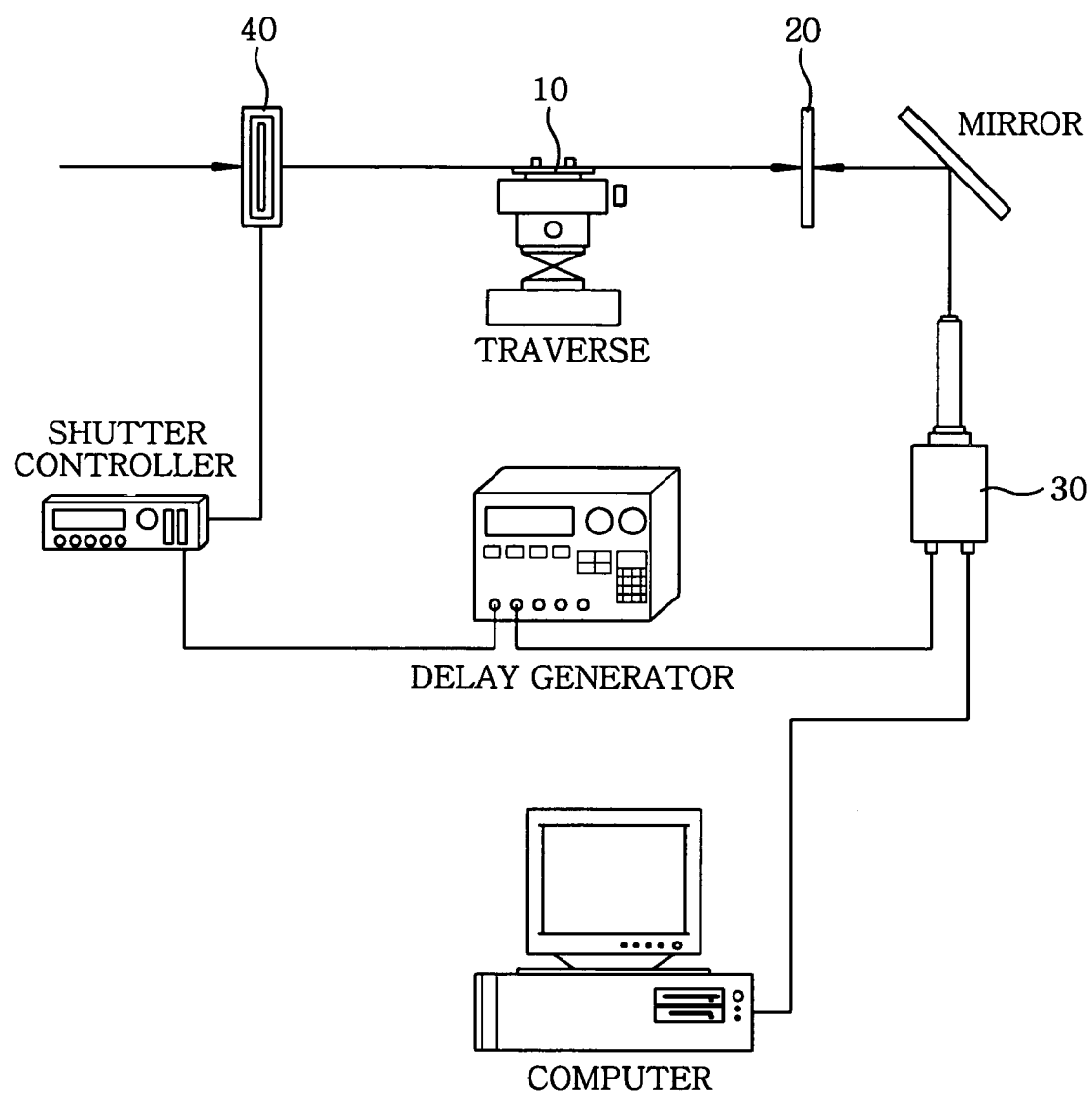
FIG. 2 describes a schematic diagram of a system for visualizing a flow and measuring a velocity field using an X-ray beam, which acquires images of particles of a flow using a radiation X-ray beam.

The present embodiment relates to an X-ray PIV system using a radiation X-ray imaging technique and a PIV velocity field measurement technique. The X-ray PIV system is schematically illustrated in FIG. 2. Phase contrast and absorption contrast occurs due to an internal structure of a tube and flowing particles while an X-ray beam irradiated from an synchrotron X-ray source passes through a flow inside an object 10 (for example, a capillary tube). Thereafter, the X-ray beam reaches a scintillator 20 (for example, thin $CdWO_4$ crystal). The scintillator 20 functions to convert an X-ray wavelength image into a visible wavelength image. Meanwhile, a particle image focused on the scintillator 20 is acquired by a Charge Coupled Device (CCD) camera 30, and a resulting image is an X-ray particle image. At this time, when an objective lens, for example, a 10×objective lens, is coupled to the CCD camera 30, higher spatial resolution can be obtained. In order to display the particle image, a display device (for example, computer and monitor) can be employed. Since two consecutive flow images are necessary for the use of PIV velocity field measurement technique, a mechanical shutter 40, having an exposure time of 20 msec and a delay time of 10 msec for example, is installed on an axis of the X-ray beam in the present embodiment, so that two or more X-ray images can be successively acquired. Desirable features of tracer particles according to the present invention include the tendency to closely track a working fluid and to be detected by an X-ray beam. Since it is not easy to select tracer particles that satisfy such requirements, the inventors carried out experiments using various particles, such as polystyrene, glass beads, lycopodium, microscale bubbles and alumina ($Al_2O_3$) microspheres. In a case of a liquid flow, a larger difference in density between tracer particles, such as bubbles or alumina microspheres, and a fluid is advantageous to acquire a clear X-ray particle image. It was determined that, of the particles, alumina microspheres and micro-scale bubbles best satisfied the requirements.

A specific example based on the present embodiment is described with reference to the accompanying drawings.

Figure 3:
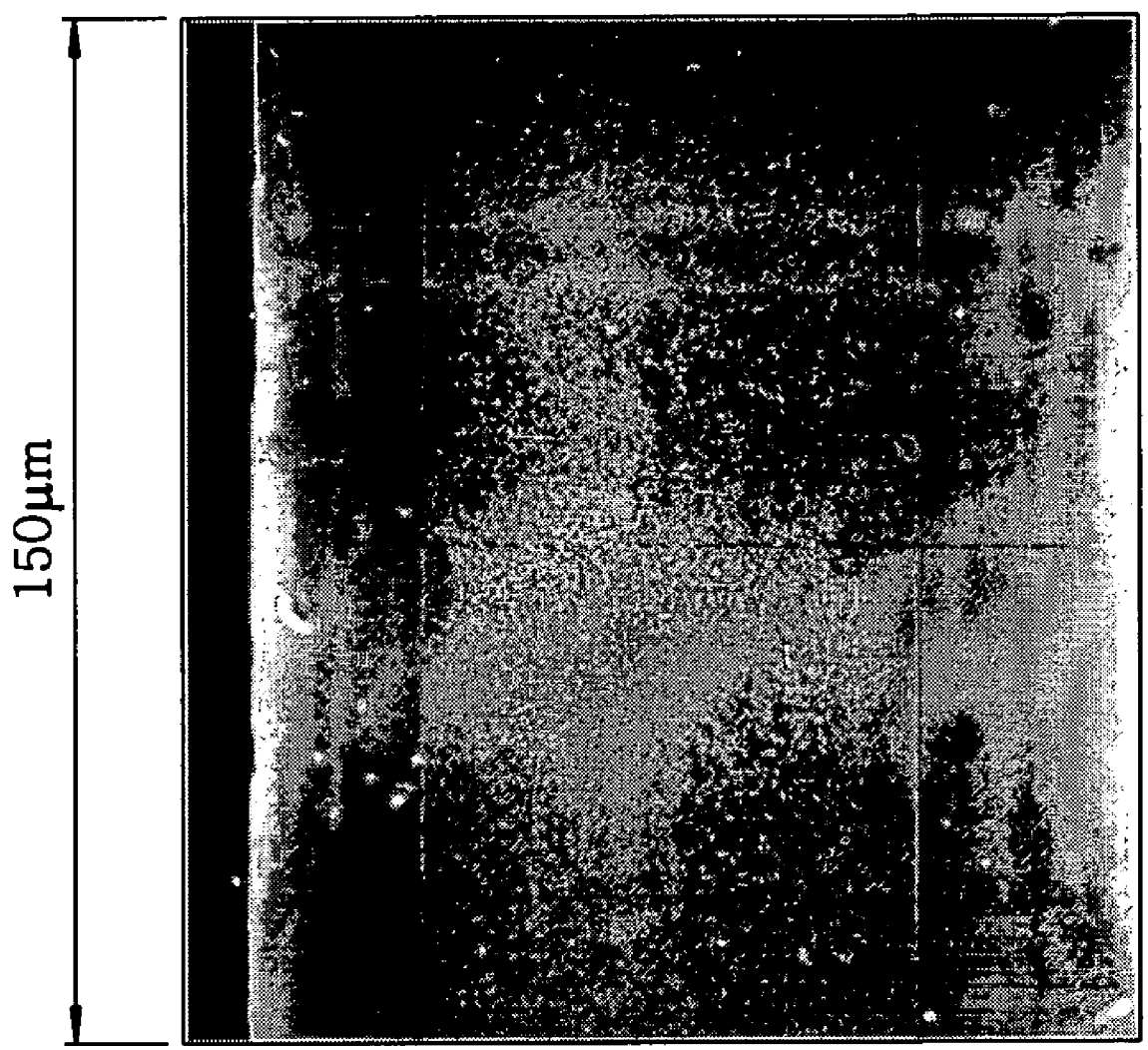
FIG. 3 illustrates an image of particles of a flow inside a Teflon microtube acquired by the X-ray imaging technique.

In the present example, alumina microspheres ($Al_2O_3$, density: 3.95 $g/cm^3$, diameter: 3 μm) were used as tracer particles, and Glycerin (density: 1.26 $g/cm^3$), which has higher viscosity and higher density than water, was used as a working fluid, so that alumina could be influenced by gravity as little as possible. FIG. 3 is a typical X-ray particle image of an interior of a capillary tube that is acquired in the present example. In this case, the size of a field of view is 1.5 mm×1.5 mm. The Glycerin flows into an opaque Teflon tube having an inner diameter of 0.75 mm. The flow rate of the fluid was being adjusted by a syringe pump. An average velocity of a flow inside the capillary tube was approximately 4.91 mm/sec.

Figure 4:
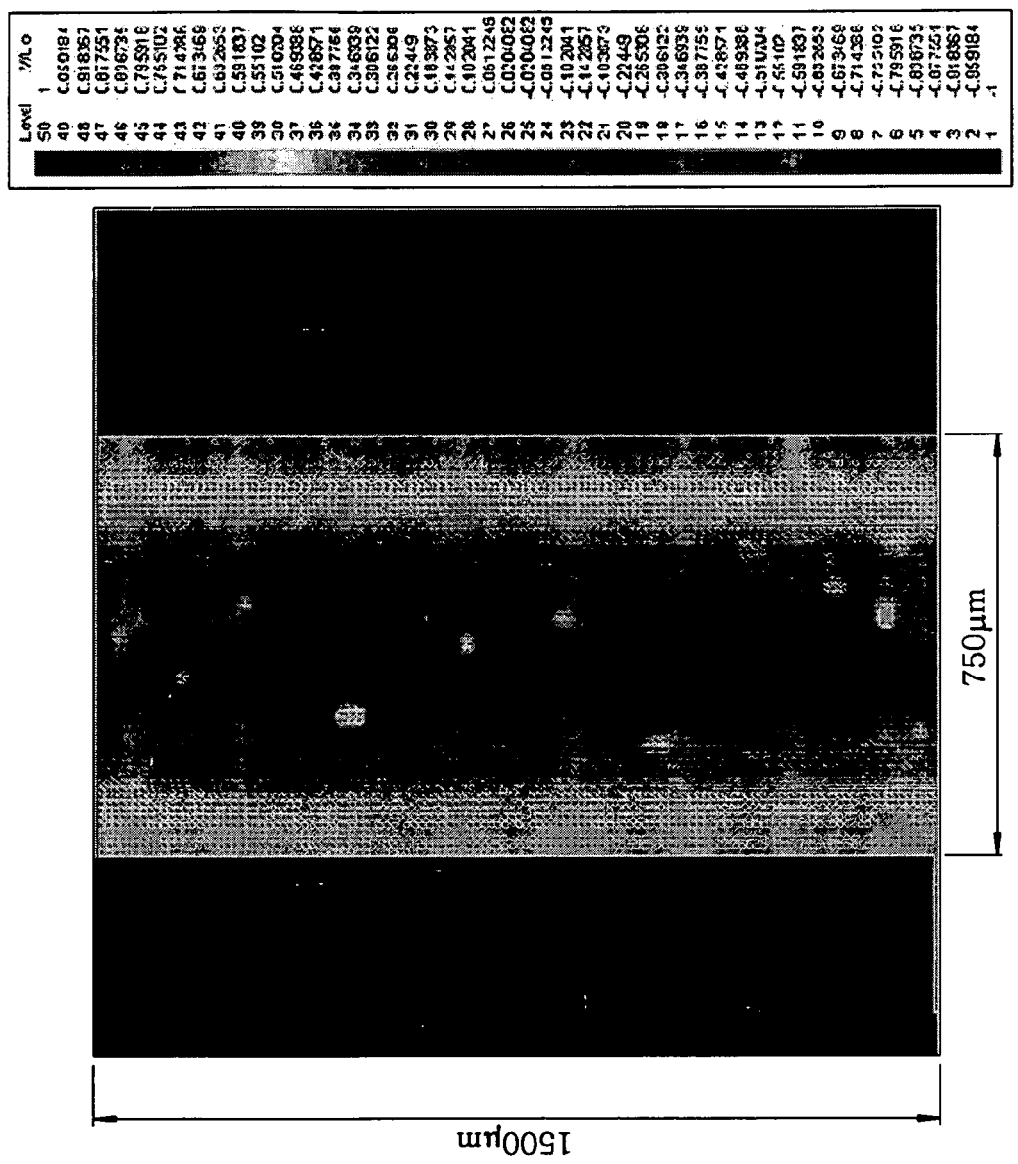
FIG. 4 shows a typical quantitative velocity field profile of an opaque microtube acquired from X-ray particle images, which are acquired by applying the PIV technique to the X-ray image shown in FIG. 3.
Figure 5:
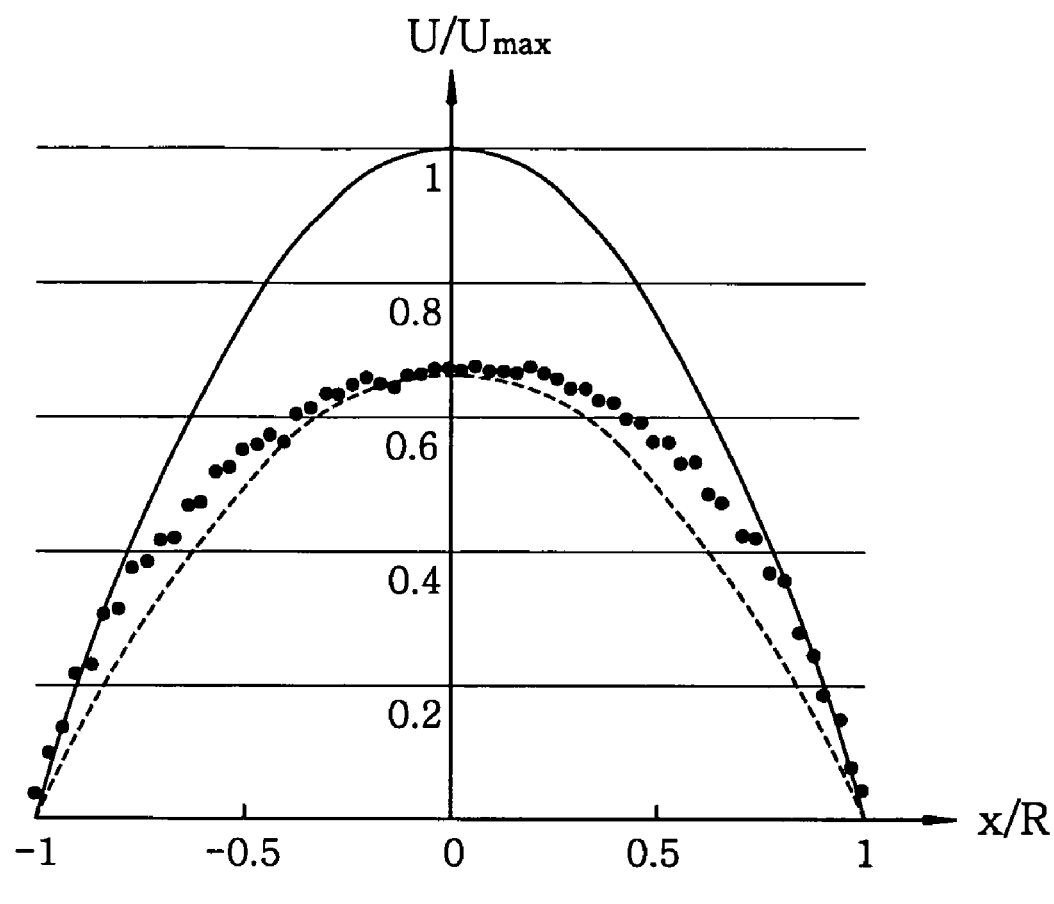
FIG. 5 presents a quantitative velocity profile at a certain section, which is obtained from the velocity field data of FIG. 4 acquired by the X-ray PIV technique.

FIG. 4 shows a quantitative velocity field inside an opaque tube, which is acquired by applying a PIV technique-based computing program to the acquired particle images as shown in FIG. 3. In this process, a PTV technique, which acquires a velocity vectors by tracking individual particles, can be employed when necessary. For example, to acquire a velocity field of red blood cells in a blood flow, the PTV technique may be advantageous. FIG. 5 shows velocity profiles on a certain section of the velocity field result (FIG. 4) acquired by the X-ray PIV technique. In this case, the flow velocity profile is symmetrical with respect to the center of the capillary tube and shows a flow in a fully developed pipe flow. Furthermore, the velocity of the flow changes in parabolically proportion to the distance from the wall of the capillary tube, and has the maximum value at the center of the capillary tube (R is a diameter of the capillary tube and $U_{max}$ is a theoretical maximum velocity in FIG. 5).

Figure 6A:
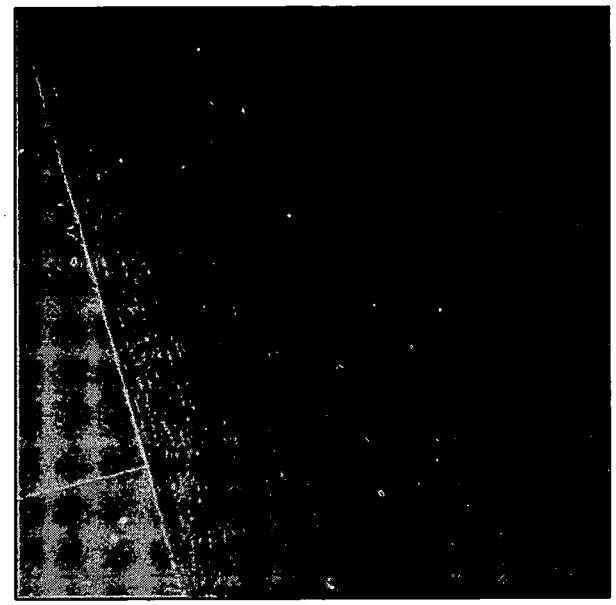
FIGS. 6A and 6B offer views showing contrast differences in images of a flow inside vascular tissue of a stem of a freesia, depending on whether a contrast medium is injected thereinto.
Figure 6B:
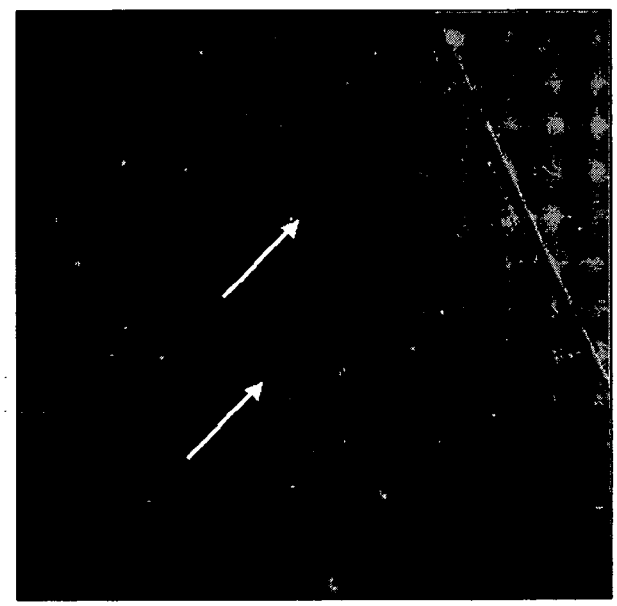

FIG. 6A shows another example. In this drawing, a result of applying an X-ray imaging techinque to a vascular tissue inside a stem of a freesia is shown, and a basic structure of the vascular tissue can be observed. Meanwhile, an image related to a case where a contrast medium is injected into the stem of the freesia is shown in FIG. 6B. As the contrast medium flows along the vascular tissue, a vessel portion is darkened compared to surroundings due to absorption contrast, so that an internal structure of a plant and a flow can be observed more clearly. In this case, the contrast medium refers to a material, such as barium, that is commonly used in a hospital to allow a tissue structure, such as blood vessels, to be more clearly observed at the time of X-ray examination. The contrast medium absorbs relatively more X-rays.

Figure 7:
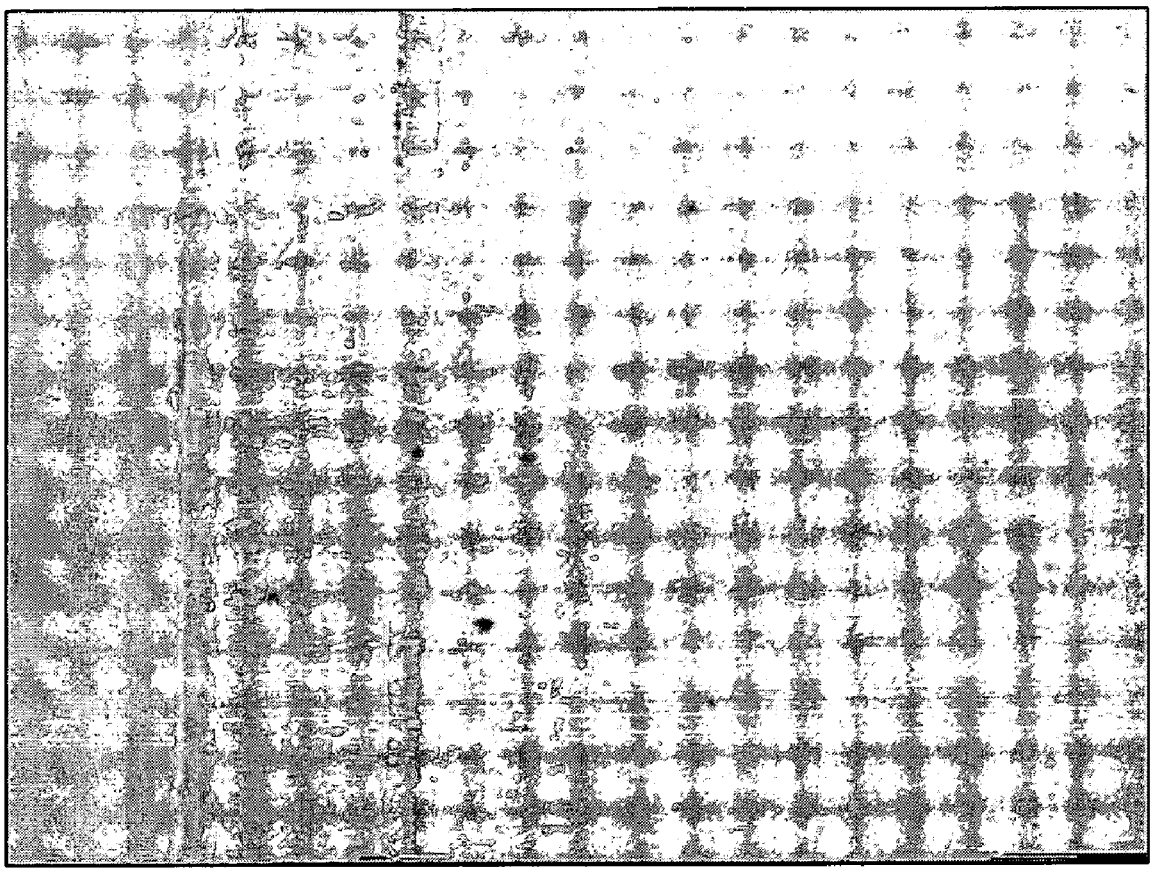
FIG. 7 provides an image of a fluid flow inside xylem vessle of a bamboo leaf, which is acquired in accordance with the present invention.

FIG. 7 shows still another example. This drawing shows an image that is obtained by photographing an interior of a slender bamboo leaf in accordance with the present invention. In the drawing, a fluid flow moving along a xylem vessel can be directly observed. The direct observation of a fluid flow inside an opaque object could not be realized by the conventional technologies, but now can be realized by the present invention. With this benefit of the present invention, variations in flow structure can be acquired by consecutively observing a water front that moves upwards along vascular vessels.

Figure 8A:
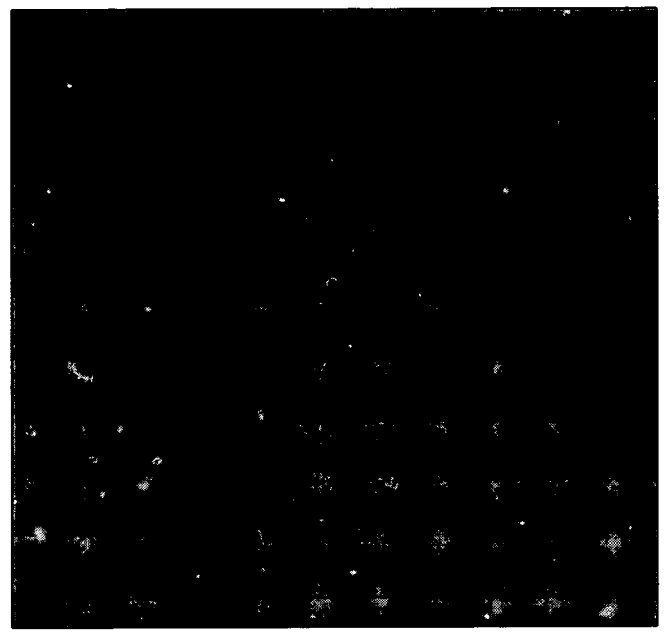
FIGS. 8A and 8B shows a microvessel profile and an image of blood flows inside an earlobe of a mouse, respectively.
Figure 8B:
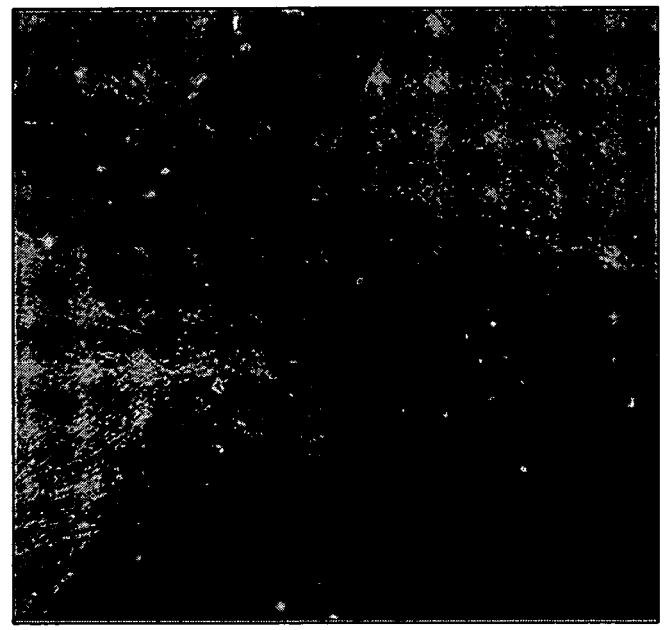

FIGS. 8A and 8B show still another example. These drawings show images of microvessels and blood inside an earlobe of a mouse.

Although, in the above examples, the radiation X-ray was used, clinical or non-destructive X-rays may be used instead. Furthermore, an X-ray generating apparatus capable of irradiating X-rays at a predetermined interval (for example, several msec) may be employed instead of the mechanical shutter.

As described above, in accordance with the present invention, a problem of the conventional PIV technique that is impossible to measure a flow inside an opaque object or an opaque fluid flow can be solved. Furthermore, in accordance with the present invention, a limitation of the conventional X-ray imaging technique that cannot be applied to a quantitative measurement of a flow inside an object can be overcome. This results from lack of employment of tracer particles tracking a flow and image processing technique to enhance difference in phase or density with respect to an X-ray. Meanwhile, the PIV velocity field measurement technique using particles has been used to acquire flow information, while the X-ray imaging technique has been used for visualizing the internal structure of a solid object. Accordingly, the two techniques differ in the field of use. As a result, there has been no attempt to apply both of the techniques together.

As described above, the present invention has a special effect in that it allows the flow information of a fluid flow in an invisible region inside an opaque object (for example, a plant, an animal, a human body, vessels inside a living body, a conduit and a tube, a fuel cell or an industrial equipment) or the flow information of an opaque fluid (for example, blood or coal tar) to be quantitatively and accurately measured.

While the invention has been shown and described with respect to the preferred embodiments, it will be understood by those skilled in the art that various changes and modifications may be made without departing from the spirit and scope of the invention as defined in the following claims.

What is claimed is:

1. A system for measuring flow information of a fluid, the system comprising:
    a light emission control unit for passing an X-ray through a specimen only at desired moments;
    a scintillator installed on an axis of a beam to convert an X-ray wavelength flow image, which is generated while the X-ray passes through the specimen, into a visible wavelength flow image; and
    a recording device for acquiring the visible wavelength flow image focused on the scintillator.

2. The system of claim 1, further comprising:
    a synchronization unit for synchronizing the recording device with the light emission control unit to acquire two or more flow images at a predetermined interval using the recording device; and
    a PIV velocity field measurement unit for extracting quantitative flow information from the two or more flow images acquired by the recording device.

3. The system of claim 1, wherein the recording device is a Charge Coupled Device (CCD) camera.

4. The system of claim 1, wherein the scintillator is thin $CdWO_4$ crystal.

5. The system of claim 1, wherein the specimen contains tracer particles that have a characteristic of tracking a working fluid and can be detected by the X-ray.

6. The system of claim 5, wherein the tracer particles are alumina ($Al_2O_3$) microspheres or micro-bubbles.

7. The system of claim 1, wherein the specimen contains a contrast medium.

8. The system of claim 1, wherein the X-ray is a radiation X-ray.

9. The system of claim 1, wherein the light emission control unit includes a mechanical shutter installed on an axis of a beam to pass the X-ray, which is irradiated from an X-ray generation apparatus, through the specimen only at the desired moments.

10. The system of claim 1, wherein the X-ray is a clinical X-ray or an X-ray used for a non-destructive testing.

11. The system of claim 10, further comprising:
    a PIV velocity field measurement unit for acquiring two or more flow images at a predetermined interval using the recording device and extracting quantitative flow information from the two or more flow images acquired by the recording device.

12. The system of claim 10, further comprising:
    a single-frame PIV velocity field measurement unit for acquiring a flow image, which is doubly exposed by the X-ray beam at a predetermined interval, using the recording device and extracting quantitative flow information from the flow image acquired by the recording device.

13. The system of claim 10, wherein the light emission unit is an X-ray generation apparatus capable of emitting X-rays at a predetermined interval.

14. The system of claim 10, wherein the recording device is coupled to an objective lens, which is placed in front of the recording device, to realize a high spatial resolution observation.

* * * * *